United States Patent
Kurylo et al.

(10) Patent No.: US 10,472,695 B1
(45) Date of Patent: Nov. 12, 2019

(54) INDUCTION HEATING OF SPRING

(71) Applicant: Barnes Group Inc., Bristol, CT (US)

(72) Inventors: Scott Kurylo, Trenton, MI (US); Mehieddine Rababeh, Dearborn, MI (US)

(73) Assignee: Barnes Group Inc., Bristol, CT (US)

( * ) Notice: Subject to any disclaimer, the term of this patent is extended or adjusted under 35 U.S.C. 154(b) by 345 days.

(21) Appl. No.: 14/262,839

(22) Filed: Apr. 28, 2014

Related U.S. Application Data

(62) Division of application No. 13/185,977, filed on Jul. 19, 2011.
(60) Provisional application No. 61/365,503, filed on Jul. 19, 2010.

(51) Int. Cl.
*H05B 6/10* (2006.01)
*C21D 9/02* (2006.01)
*C21D 1/42* (2006.01)

(52) U.S. Cl.
CPC ........ *C21D 9/02* (2013.01); *C21D 1/42* (2013.01)

(58) Field of Classification Search
None
See application file for complete search history.

(56) References Cited

U.S. PATENT DOCUMENTS

| | | | | |
|---|---|---|---|---|
| 2,219,376 A | | 10/1940 | Young et al. | |
| 2,495,193 A | * | 1/1950 | Wells | H05B 6/40 219/635 |
| 3,541,832 A | | 11/1970 | Loftus et al. | |
| 3,556,491 A | * | 1/1971 | Greis | C21D 9/0075 219/654 |
| 3,684,851 A | * | 8/1972 | Reinke | C21D 1/10 219/639 |
| 3,699,302 A | * | 10/1972 | Griffith | H05B 6/02 219/639 |
| 3,737,613 A | * | 6/1973 | Gillock | H05B 6/362 219/652 |
| 3,824,367 A | * | 7/1974 | Balzer | C21D 1/10 219/652 |
| 3,836,743 A | * | 9/1974 | Wardwell | C21D 1/42 219/632 |
| 3,906,766 A | * | 9/1975 | Sato | G05B 19/25 72/132 |
| 4,111,407 A | * | 9/1978 | Stager | F16F 1/08 267/166 |
| 4,164,997 A | | 8/1979 | Mueller | |

(Continued)

FOREIGN PATENT DOCUMENTS

| | | |
|---|---|---|
| EP | 1659189 | 5/2006 |
| JP | 07220863 | 8/1995 |

(Continued)

*Primary Examiner* — Ibrahime A Abraham
*Assistant Examiner* — Gyounghyun Bae
(74) *Attorney, Agent, or Firm* — Fay Sharpe LLP

(57) ABSTRACT

An apparatus for hardening a spring having a helical or beehive shape. The apparatus has a rotation support system and an induction heating system. The rotation support system is designed to support the spring while the spring is heated by the induction heating system. The induction heating system has an induction coil system having a coil system. The coil system has a spaced region designed to receive the spring and to heat the spring while the spring is supported on the rotation support system.

36 Claims, 8 Drawing Sheets

(56) References Cited

U.S. PATENT DOCUMENTS

| | | | | |
|---|---|---|---|---|
| 4,197,441 A | * | 4/1980 | Rudd | B23K 13/02 219/106 |
| 4,294,098 A | * | 10/1981 | Egorov | B21D 53/886 266/115 |
| 4,424,695 A | * | 1/1984 | Kirchhoff | F16F 1/08 72/128 |
| 4,431,891 A | * | 2/1984 | Forstner | B23K 1/002 219/605 |
| 4,439,977 A | | 4/1984 | Stumpf | |
| 4,444,036 A | * | 4/1984 | Shibata | B21F 3/10 700/95 |
| 4,520,644 A | * | 6/1985 | Lampietti | B21F 3/04 72/131 |
| 4,571,973 A | * | 2/1986 | Morita | B21F 3/10 72/137 |
| 4,669,289 A | * | 6/1987 | Itaya | B21F 3/00 72/138 |
| 4,705,580 A | * | 11/1987 | Yamazaki | B21F 3/02 148/568 |
| 4,856,641 A | | 8/1989 | Matsumura et al. | |
| 4,934,165 A | * | 6/1990 | Philpot | B21F 3/00 72/132 |
| 4,945,744 A | * | 8/1990 | Lienert | B21F 3/10 72/137 |
| 4,967,580 A | * | 11/1990 | Morita | B21F 3/10 72/137 |
| 4,986,103 A | * | 1/1991 | Jacobson | B21F 3/02 140/89 |
| 5,014,769 A | * | 5/1991 | El-Kaddah | H05B 6/22 164/493 |
| 5,105,642 A | * | 4/1992 | Mohr | B21F 3/02 140/3 CA |
| 5,269,165 A | * | 12/1993 | Matsuoka | B21F 3/10 72/138 |
| 5,285,669 A | * | 2/1994 | Itaya | B21F 3/02 140/140 |
| 5,330,593 A | | 7/1994 | Stengel | |
| 5,553,443 A | | 9/1996 | St. Clair et al. | |
| 5,572,853 A | | 11/1996 | St. Clair et al. | |
| 5,632,371 A | | 5/1997 | Best et al. | |
| 5,706,687 A | * | 1/1998 | Welsh | B21F 3/02 72/138 |
| 5,718,406 A | * | 2/1998 | Long | A47B 9/02 108/147 |
| 5,875,664 A | * | 3/1999 | Scott | B21F 3/12 72/135 |
| 6,022,427 A | | 2/2000 | Wienand | |
| 6,119,322 A | | 9/2000 | Eto | |
| 6,235,131 B1 | * | 5/2001 | Keihle | C21D 1/40 148/320 |
| 6,310,333 B2 | * | 10/2001 | Shibata | B29C 45/2738 219/635 |
| 6,409,163 B1 | | 6/2002 | Stewart | |
| 6,550,301 B2 | * | 4/2003 | Hasegawa | B21F 3/02 29/896.9 |
| 6,648,996 B2 | * | 11/2003 | Hasegawa | B21F 3/02 148/580 |
| 6,779,564 B2 | * | 8/2004 | Hasegawa | B60G 15/063 140/89 |
| 6,836,964 B2 | * | 1/2005 | Hasegawa | B21F 3/02 29/896.9 |
| 7,198,068 B2 | * | 4/2007 | Dixon | B21F 3/10 140/103 |
| 7,267,519 B2 | | 9/2007 | Cresswell et al. | |
| 7,416,075 B2 | | 8/2008 | Haustein et al. | |
| 7,648,600 B2 | * | 1/2010 | Tanaka | C21D 1/42 148/567 |
| 7,676,297 B2 | * | 3/2010 | Chang | B21F 35/00 29/896.8 |
| 8,124,915 B2 | * | 2/2012 | Bertram | B29C 65/7894 219/243 |
| 8,186,489 B2 | * | 5/2012 | Zimmer | A47B 88/047 188/265 |
| 8,424,352 B2 | * | 4/2013 | Jung | B21F 35/00 140/103 |
| 8,438,733 B2 | * | 5/2013 | Jung | B21F 3/04 29/896.91 |
| 8,915,112 B2 | * | 12/2014 | Eto | B21F 3/04 72/135 |
| 9,038,432 B2 | * | 5/2015 | Graf | B21F 1/02 72/371 |
| 9,139,318 B2 | * | 9/2015 | Lee | B65B 5/04 |
| 2007/0074792 A1 | | 4/2007 | Vondracek | |
| 2007/0138169 A1 | | 6/2007 | Yoshimasa | |
| 2007/0204939 A1 | | 9/2007 | Oka et al. | |
| 2008/0128057 A1 | | 6/2008 | Hufnagel | |
| 2009/0045556 A1 | | 2/2009 | Bails | |

FOREIGN PATENT DOCUMENTS

| | | |
|---|---|---|
| JP | 2000323036 | 5/1999 |
| JP | 2002228045 | 1/2000 |
| WO | 1998053933 | 5/1998 |

* cited by examiner

INDUCTION HEATING OF SPRING

The present invention is a divisional of U.S. application Ser. No. 13/185,977 filed Jul. 19, 2011, which in turn claims priority on U.S. Provisional Application Ser. No. 61/365,503 filed Jul. 19, 2010, which is fully incorporated herein by reference.

The present invention is directed generally at the hardening of metal springs, and particularly to the metal hardening of springs by use of an induction heating process.

BACKGROUND OF THE INVENTION

The metal hardening process is a standard process used in spring fabrication. One common hardening process consists of a traditional atmospheric furnace. Such hardening processes are very slow. Springs can be formed from a variety of metals (e.g., stainless steel, carbon steel, alloy steel, etc.). When the metal of the spring is properly hardened and tempered, specific metallurgical parameters such as hardness and micro-structure can be attained.

When a spring is hardened by a traditional atmospheric furnace, the spring is first placed in an oven set at a certain temperature for a particular period of time. Thereafter, the spring is removed and quenched in oil or some other quenching liquid. After this initial hardening process, the spring hardness is generally higher than desired. As such, the spring is generally subjected to a tempering process until the spring obtains the desired physical properties. When the spring is properly processed, some of the crystalline structure of the steel is changed to tempered martensite with much of the carbides dissolved so as to provide the desired core structure of the spring and desired surface hardness of the spring.

Another process that is used for hardening springs is induction heating. The induction heating process occurs by inducing an electromagnetic field in a conductive material of the spring. Eddy currents are generated within the conductive material whose resistance leads to Joule heating. Induction heating can be used to heat steel to its melting point if need be which is more than sufficient to austenitize the product.

The induction heating process can provide a faster heating cycle time than heating by traditional atmospheric furnaces, and the induction heating process can simplify the material handling of the springs, and can potentially enable automation of the material handling of the spring in the hardening process. Although induction heating has several advantages over traditional atmospheric furnaces, induction heating of springs has problems with evenly heating the spring throughout spring length, overheating the ends of the spring, and the maintaining of induction coil efficiency.

In view of the current state of the art of hardening springs, there is a need for an improved hardening process that is less labor intensive and less time consuming than hardening via a traditional atmospheric furnace, and which evenly heats the spring throughout the spring length.

SUMMARY OF THE INVENTION

The present invention is directed to the hardening of metal springs by use of a novel induction heating process. The hardening process of the present invention overcomes and addresses the deficiencies of past induction heating processes for use with coiled springs. The invention is particularly directed to straight, cylindrical compression springs (e.g., helical springs, etc.) or beehive-shaped compression springs; however, the hardening process of the present invention can be used to harden other types of springs. The hardening process of the present invention includes the use of induction heating of the spring which produces even heating distribution in the spring in a significantly shorter time duration than heating by a traditional atmospheric furnace, and which hardening process yields springs which are metallurgically equivalent to or superior to springs hardened by traditional hardening processes using traditional atmospheric furnaces.

In one non-limiting aspect of the present invention, there is provided a novel induction coil configuration for the induction coil. The induction coil is generally a liquid cooled induction coil; however, the induction coil can be cooled by other or additional means. In one non-limiting embodiment of the invention, the induction coil is positioned on two sides of the spring along at least a portion of the longitudinal length of the spring. As can be appreciated, the coils of the induction coil can be positioned on more than two sides of the spring. Generally, the induction coils are spaced at a generally constant distance from one another along at least a portion of the longitudinal length of the spring. Typically, the induction coils are spaced at a generally constant distance from one another along the complete longitudinal length of the spring. Many different induction coil configurations can be used to heat the spring. In one non-limiting design, the induction coil has a generally square or rectangular shape. In another non-limiting embodiment of the invention, the induction coil has a reducing inside-diameter with one or more turns. In such a configuration, at least two coils are positioned along at least a portion of the longitudinal length of the spring and at least one coil is positioned on an opposite side of the spring and along at least a portion of the longitudinal length of the spring. As can be appreciated for any of the induction coil configurations, a) the number of coils on each side of the spring can be the same or different, b) the length of the one or more coils on one or more longitudinal sides of the spring can be the same or different, c) the length of the one or more coils on one or more longitudinal sides of the spring can be the same or different, d) the length of one or more of the coils can be greater than, equal to or less than the longitudinal length of the spring, e) the cross-sectional area of the one or more coils along the longitudinal length of the coil can be constant or vary, f) the cross-sectional area of two or more coils can be the same or different, g) the spacing of one or more of the coils from the spring along the longitudinal length of the spring can be constant or vary, and/or h) two or more of the coils can lie in the same or parallel plane along a majority or all of the longitudinal length of the spring. In still another non-limiting embodiment of the invention, more than one induction coil can be used to heat the spring. The novel induction coil configuration enables eddy currents generated during induction heating of the spring to be focused into two highly concentrated "beams" of heating area, thereby producing an efficient heating of the spring. This heating effect, combined with natural conduction through the spring, provides consistent and rapid heating of the spring.

In another and/or alternative non-limiting aspect of the present invention, the spring is slowly rotated during induction heating of the spring. The spring can be rotated in any number of ways. The rotational speed of the spring during induction heating is generally less than about 100 rpm, typically less than about 50 rpm, more typically about 0.25-40 rpm, even more typically about 1-30 rpm. The rotation speed of the spring can be constant or be varied during the heating of the spring. It has been found that a slow rotation speed of the spring during induction heating results in a more proper distribution of heat in the spring during induction heating. Rotation speeds that are too high have been found to result in overheating of the end portions of the spring during induction heating. Such overheating can result in the welding together of portions of the end coils of the springs during induction heating and/or adversely alter the micro-structure of the spring. In addition, it has been found that by supporting the spring on its side during rotation and heating also inhibited or prevented the spring to sag and deform in shape under its own weight during the heating process. In one non-limiting embodiment of the invention, rollers are used to rotate the spring during the heating of the spring. One or more springs are placed on two or more rollers. The rollers are generally formed of a material that is not heated by the one or more induction coils (e.g., ceramic, etc.) so as to not create hot points on the one or more springs during the heating of the one or more springs. As can be appreciated, other or additional materials can be used to form one or more portions of the roller. When rollers are used, the spring is generally placed on top of the rollers and is supported by the rollers during the heating and rotating process; however, this is not required. The rollers can also be used to move the one or more springs along the longitudinal length of the rollers; however, this is not required. The speed of rotation and/or rotation direction of one or more of the rollers can be controlled to cause the spring to be moved toward, between, and/or away from the one or more coils of the inductor; however, this is not required.

In still another and/or alternative non-limiting aspect of the present invention, one or more coils of the induction coil are positioned above or below the central axis of the spring when the spring is heated. Such a positioning of the induction coils has been found to provide more uniform heating of the spring. Generally, the central axis of one or more of the induction coils are offset from the central axis of the spring by 5-50% of the diameter of the spring, and typically about 10-45% of the diameter of the spring, and still more typically about 10-40% of the diameter of the spring.

In yet another and/or alternative non-limiting aspect of the present invention, the induction coil can be configured so that the spring can continuously move along the longitudinal length of the induction coil during a heating process so as to facilitate in automated heating of the spring. An indexing arrangement can optionally be used to facilitate in the feeding and/or positioning of a plurality of springs on the rollers. Such an arrangement can be used to facilitate in the automation of the heating of the springs.

In still yet another and/or alternative non-limiting aspect of the present invention, the rollers used to rotate the spring can be designed to rotate at various speeds to cause the spring to move along the longitudinal length of the rollers; however, this is not required.

In a further and/or alternative non-limiting aspect of the present invention, the rollers used to rotate the spring can be movable toward and/or away from one another; however, this is not required. In such an arrangement, the rollers can be designed to separate from one another so that the spring can fall between the rollers. For example, the spring can be dropped between the roller and into a quench tank after the heating of the spring; however, this is not required. As can be appreciated, the one or more springs can be quenched in a variety of ways (e.g., sprayed with quench liquid, inserted into a quench tank, etc.).

There are generally two basic approaches to induction heating. The first approach is to use higher frequency power generation to yield surface heating. In this kind of heating, the surface of the spring is the area of concentration for the heating. Conduction throughout the cross-section of the spring allows complete heating while induction takes place only at the surface. This method of heating is faster. The second approach is to use lower frequency power generation to yield deep penetration heating or subsurface heating. This kind of heating is usually slower but more complete since the entire cross-section of the spring is brought up to temperature at the same rate. Surface heating is generally more desirable than subsurface heating for spring heat treatment since there is very little "core" to heat.

In a further and/or alternative non-limiting aspect of the present invention, a quench tank is used to partially or fully quench the heated spring. In one non-limiting embodiment of the invention, the quench tank is positioned below the rollers and is designed to receive the heated spring when the heated spring has passed between the rollers or passes off the end of the rollers. The quench fluid generally is or includes oil; however, other or additional quench fluids can be used.

In a still further and/or alternative non-limiting aspect of the present invention, a temperature monitor is used to monitor the temperature of the heated spring.

In yet a further and/or alternative non-limiting aspect of the present invention, induction coil configurations for hardening springs generally have one or more or all of the following characteristics:

When a single induction coil is used to heat the spring, the shape of the induction coil generally has a "rounded rectangular" or "square rectangular" configuration. When the induction coil includes more than one loop, the induction coil has a reducing inside diameter, with all coil segments kept in generally the same horizontal plane.

The water inlets of the induction coil generally are positioned at an offset to one side of the induction coil so as to not interfere with the maximum effective heating length of the induction coil.

The effective heating length of the induction coil (i.e., the length at which the springs may be placed between the induction coils) generally does not include the non-rounded portions of the induction coil.

When multiple springs are being simultaneously heated by the induction coil, the ends of different springs should be spaced at least about 0.25-5 times the wire diameter of the spring from one another so as to inhibit or prevent undesired overheating of one or both ends of the springs.

The sides of the springs should be placed about 0.25-3 times the spring wire diameter from the surface of the inner induction coil loop. Generally, the spacing of both sides of the spring from the inner induction coil loop is about the same so as to obtain uniform heating of the spring.

The spacing between non-rounded induction loop portions of the induction coil is generally maintained constant along the complete longitudinal length of the non-rounded induction loop portions and the spacing between adjacently positioned non-rounded induction loop portions is about 0.01-1 time the average width (e.g., diameter for a tube) of the non-rounded induction loop portions.

When a single induction coil is used to heat the spring, the number of induction coil loops in the induction coil is generally about 1-5 and typically depends on the wire diameter of the spring being heated. Larger spring wire diameters may require a larger number of induction coil loops in the induction coil.

It is one non-limiting object of the present invention to provide an induction heating arrangement that has improved heating of springs.

It is another and/or alternative non-limiting object of the present invention to provide an induction heating arrangement that heats one or more springs that are supported on two or more rollers.

It is still another and/or alternative non-limiting object of the present invention to provide an induction heating arrangement that includes at least two coil portions that are positioned such that at least a portion of the two coil portions are parallel to one another and are designed to enable one or more springs to be positioned between such parallel portions and designed to heat the one or more springs while at least partially positioned between such parallel portions.

It is yet another and/or alternative non-limiting object of the present invention to provide an induction heating arrangement that controls a rotation speed of the spring during the heating of the spring.

It is still yet another and/or alternative non-limiting object of the present invention to provide an induction heating arrangement that includes an induction coil configuration that is used to control the distance of the spring from the one or more coil portions of the induction heating arrangement so as to properly heat the spring.

It is another and/or alternative non-limiting object of the present invention to provide an induction heating arrangement that maintains two or more springs a sufficient distance from one another during a heating process so as to not adversely affect the heating of the springs.

It is still another and/or alternative non-limiting object of the present invention to provide an induction heating arrangement that includes one or more induction coils having a generally "rounded rectangular or square", "square rectangular", or "square" configuration.

It is yet another and/or alternative non-limiting object of the present invention to provide an induction heating arrangement that includes an induction coil having more than one loop and which induction coil has a reducing inside diameter and all of the coil segments lie generally in the same horizontal plane.

It is still yet another and/or alternative non-limiting object of the present invention to provide an induction heating arrangement that includes an induction coil having water inlets that are generally are positioned at an offset to one side of the induction coil so as to not interfere with the maximum effective heating length of the induction coil.

It is another and/or alternative non-limiting object of the present invention to provide an induction heating arrangement that includes an induction coil having an effective heating length that generally does not include the non-rounded portions.

It is still another and/or alternative non-limiting object of the present invention to provide an induction heating arrangement wherein multiple springs have adjacently positioned ends that are sufficiently spaced apart from one another so as to inhibit or prevent undesired overheating of one or both ends of the springs.

It is yet another and/or alternative non-limiting object of the present invention to provide an induction heating arrangement that includes an induction coil that is spaced a sufficient distance from the spring to properly heat the spring.

It is still yet another and/or alternative non-limiting object of the present invention to provide an induction heating arrangement that includes an induction coil that is uniformly spaced from the spring to properly heat the spring.

It is another and/or alternative non-limiting object of the present invention to provide an induction heating arrangement that treats a spring so that the spring has lower residual stresses than springs treated by conventional heating processes.

These and other objects and advantages will become apparent from the following description taken together with the accompanying drawing.

BRIEF DESCRIPTION OF DRAWINGS

Reference may now be made to the drawings, which illustrate various embodiments that the invention may take in physical form and in certain parts and arrangements of parts wherein.

DESCRIPTION OF NON-LIMITING EMBODIMENTS OF THE INVENTION

Figure 1:
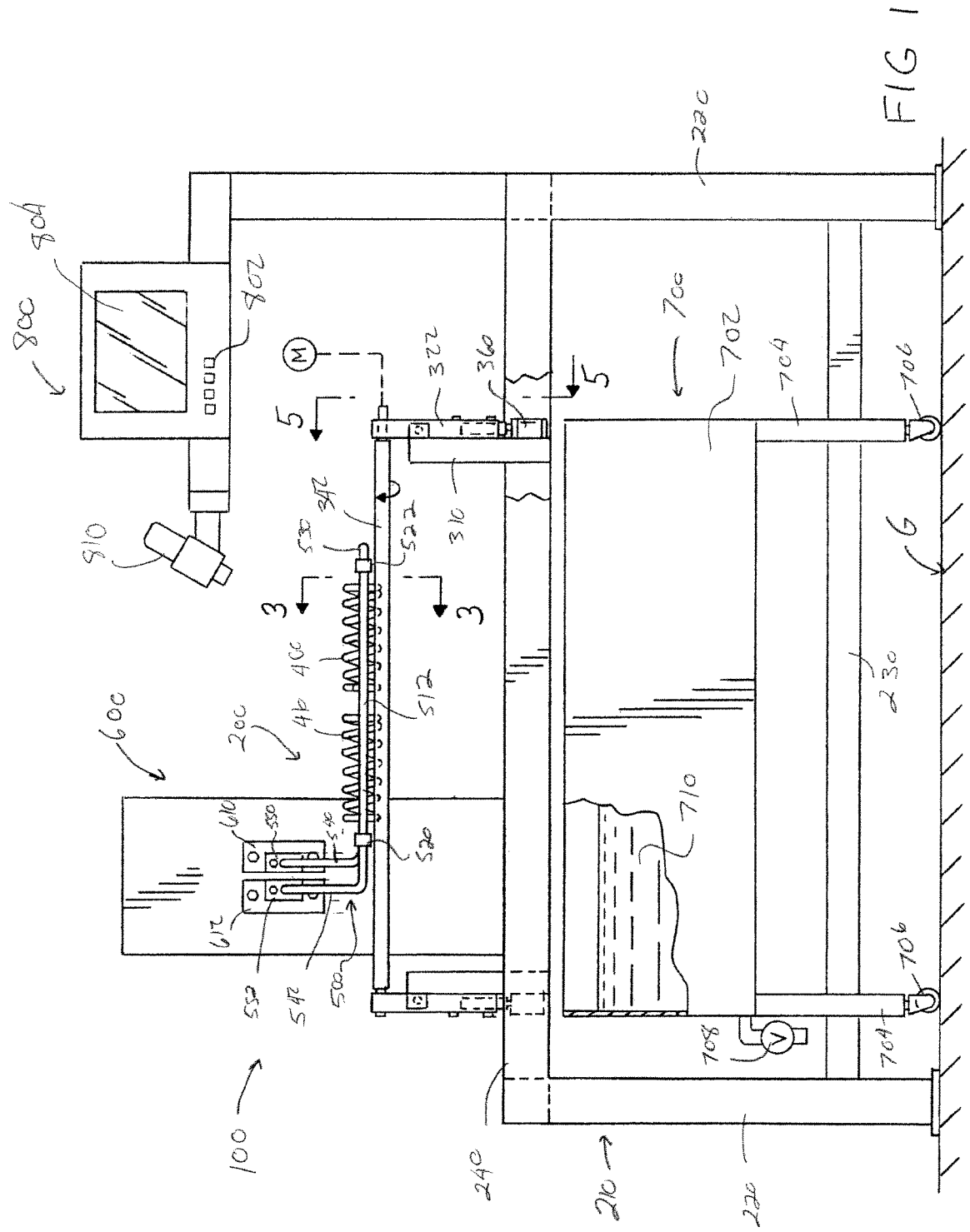
FIG. 1 is a side view of one non-limiting arrangement for processing springs in accordance with the present invention.

Referring now to the drawings wherein the showings are for the purpose of illustrating non-limiting embodiments of the invention only and not for the purpose of limiting same, FIGS. 1-6 illustrate one non-limiting processing arrangement 100 for heating and hardening a spring in accordance with the present invention. Processing arrangement 100 is illustrated as a batch process for heating and hardening one or more springs. As can be appreciated, processing arrangement 100 can be configured to heat and harden springs by a continuous non-batch process; however, this is not required. The springs that are heated and hardened by processing arrangement 100 are typically helical or beehive springs and the invention will be described with particular reference to such springs; however, it can be appreciated that other types of springs can be heated and hardened. As can also be appreciated, metal rods or tubes having a generally circular cross-section shape can also be heated and hardened by processing arrangement 100. The helical or beehive springs that are heated and hardened by processing arrangement 100 have a generally constant shape, constant cross-section shape, and/or cross-section area along a majority or the complete the longitudinal length of the helical or beehive spring; however, this is not required. At least a portion of the helical or beehive spring is formed of an electrically conductive material that can be heated by a field generated by an induction coil. Typically, a majority or all of the helical or beehive spring is formed of an electrically conductive material that can be heated by a field generated by an induction coil. The length of the helical or beehive spring and/or the thickness of the wire of the helical or beehive spring are non-limiting. Generally, the thickness of the wire of the helical or beehive spring is constant along the longitudinal length of the helical or beehive spring; however, this is not required. When two or more helical or beehive springs are heated and hardened together by processing arrangement 100, such helical or beehive springs generally have the same length, shape, cross-section shape, cross-section area, and wire thickness; however, this is not required.

Referring to FIG. 1, there is illustrated a processing arrangement 100 that includes an induction arrangement 200, a quench arrangement 700, and a control arrangement 800. The induction arrangement includes a processing frame 210 upon which various components of the induction processing equipment are mounted thereon. The processing frame 210 is illustrated as including legs 220 that are positioned on a ground surface G. The legs can be mounted to the ground surface; however, this is not required. The processing frame also is illustrated as having a support bar 230 that is connected between the legs to provide rigidity to the processing frame. As can be appreciated, the configuration of the processing frame is non-limiting. The processing frame is generally formed of a durable material such as metal; however, other materials can be used. The processing frame materials can be formed of solid material, tubular material, etc. The processing frame includes top rails 240 that are connected to the legs.

Figure 2:
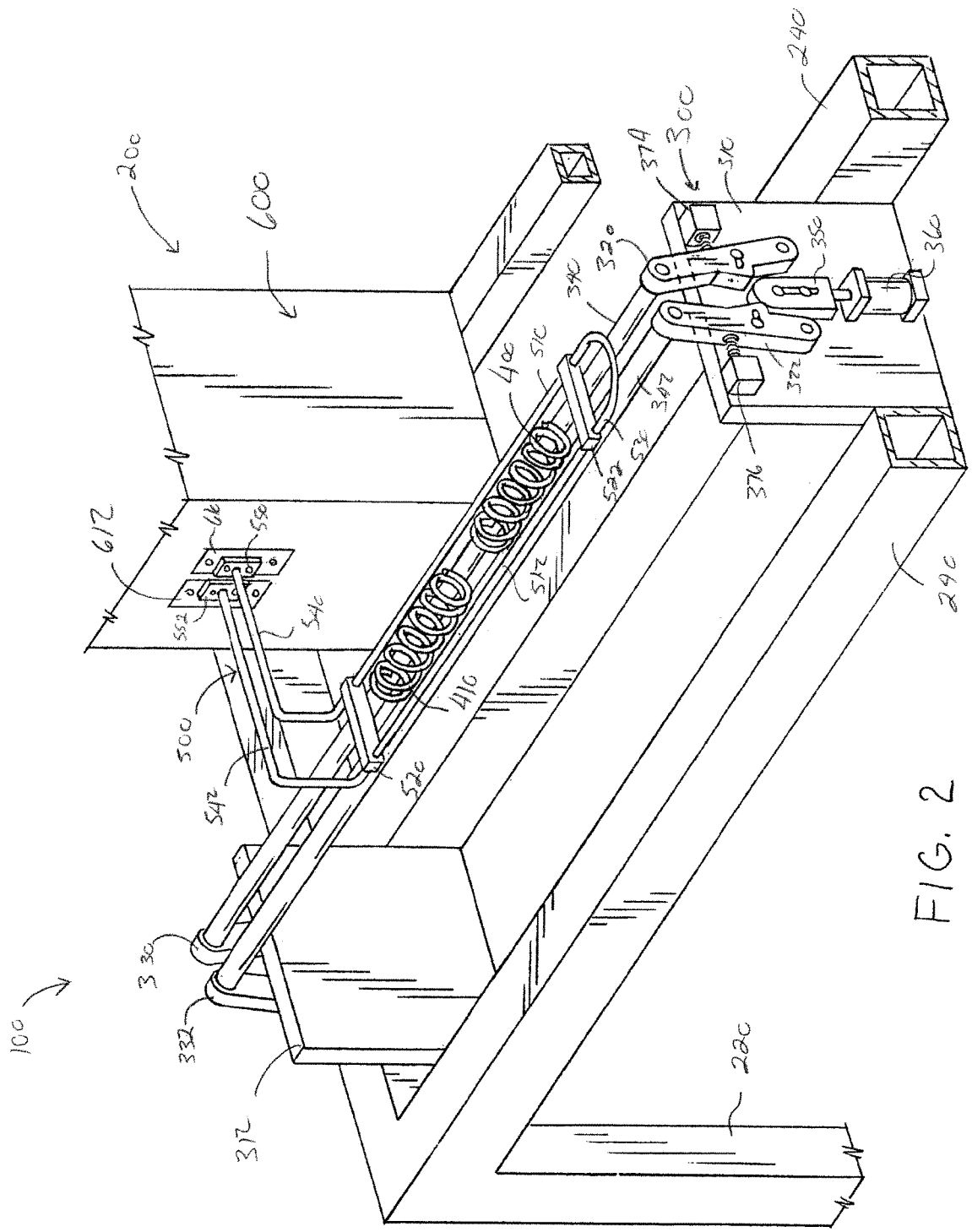
FIG. 2 is an enlarged view of FIG. 1 illustrating one non-limiting heating arrangement for a spring in accordance with the present invention.

As illustrated in FIGS. 1 and 2, a coil support and rotating system 300 are connected to the top rails of the processing frame. As can be appreciated, the coil support and rotating system are not required to be connected to the processing frame. The coil support and rotating system 300 are illustrated as having two end plates 310, 312 that are connected to the top rails of the processing frame. Connected to each of the end plates is a pair of roller support legs 320, 322, 330, 332. The roller support legs rotatably support two rollers 340, 342. The two rollers are positioned parallel to one another and the longitudinal axis of each roller generally lies in the same horizontal plane; however; this is not required. One or more drive arrangements M are used to rotate one or both of the rollers. The control arrangement 800 can be used to control the rotation speed and/or rotation direction of one or both rollers. Generally, the two rollers have the same diameter and are rotated at the same speed; however, this is not required.

As illustrated in FIGS. 1 and 2, the rollers are spaced apart from one another at a distance that enables the roller to support helical springs 400, 410. One or more helical or beehive springs can be processed at a time while positioned on the rollers. The length of the rollers; the length, size and weight of the springs; and the size and configuration of the induction coil 500 will generally dictate the maximum number of springs that can be heated at the same time of the rollers.

As illustrated in FIGS. 1 and 2, two helical springs are positioned and supported on the outer surface of the rollers. The two helical springs are illustrated as having generally the same length, the same wire size, and the same cross-sectional shape and area; however, this is not required. When more than one spring is positioned on the rollers, the ends of the springs are generally separated from one another so as to not interfere with the proper heating of the springs. The spacing of three or more springs on the rollers does not need to be same, but a minimum spring spacing between the springs should be maintained. Generally, when multiple springs are being simultaneously heated on the roller, the ends of the different springs should be spaced apart at least about 0.25 times the wire diameter of the largest wire diameter spring so as to inhibit or prevent undesired overheating of one or both ends of the springs. Typically, the ends of different springs are spaced apart at least about 0.5 times the wire diameter of the largest wire diameter spring, more typically spaced apart at least about 1 times the wire diameter of the largest wire diameter spring, still more typically spaced apart at least about 2 times the wire diameter of the largest wire diameter spring, even more typically spaced apart at least about 3 times the wire diameter of the largest wire diameter spring, and still even more typically spaced apart at least about 4 times the wire diameter of the largest wire diameter spring. The maximum distance the ends of the springs can be spaced apart is non-limiting.

Figure 3:
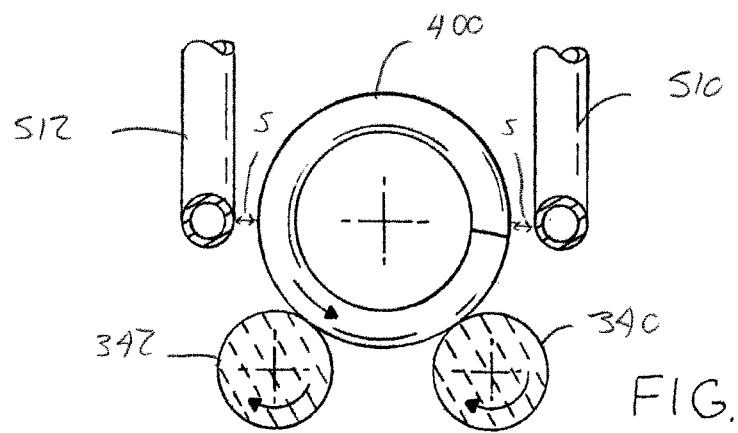
FIG. 3 is a cross-section view along line 3-3 of FIG. 1.

Referring now to FIGS. 2 and 3, the one or more helical springs on the rollers are positioned between coil legs 510, 512 of the induction coil 500. Coil legs 510, 512 are generally parallel to one another. Also, coil legs 510, 512 each have a longitudinal axis that lies in generally the same plane; however, this is not required. As illustrated in FIG. 2, the horizontal plane of the longitudinal axis of the two rollers is generally parallel to the horizontal plane of the longitudinal axis of the coil legs 510, 512. Such an arrangement ensures that the coil legs 510, 512 are aligned on an axis that is parallel the central axis of the helical springs on the rollers. The longitudinal axis of the coil legs can be positioned above, below or on the same level as the longitudinal central axis of the helical springs when the helical springs are positioned and supported on the rollers. As illustrated in FIG. 3, the longitudinal axis of the coil legs is positioned on the same level as the longitudinal central axis of the helical springs when the helical springs are positioned and supported on the rollers.

The distance of the outer surface of the one or more helical springs on the rollers from coil legs 510, 512 is controlled so as to obtain uniform heating of the helical spring. Generally, the spacing S of the outer surfaces of the helical springs from coil legs 510, 512 is the same as illustrated in FIG. 3. Generally, the spacing of the outer surface of the helical spring from the coil legs of the induction coil is at least about 0.25 times the wire diameter of the helical spring. The spacing between the induction coil is generally dependent on the diameter of the wire and/or diameter of the helical spring. for springs that do not have a constant cross-sectional shape and/or cross-sectional area along the longitudinal length or axis of the spring, the shape of the induction coil can be customized to maintain a proper spacing between the outer surface of the spring and the induction coil. As such, adjustable induction coils can be used to accommodate different shaped springs. Generally, a majority of the length of the spring has a constant spacing between the outer surface of the spring and the induction coil, typically at least about 70% of the length of the spring has a constant spacing between the outer surface of the spring and the induction coil, more typically at least about 75% of the length of the spring has a constant spacing between the outer surface of the spring and the induction coil, still more typically at least about 80% of the length of the spring has a constant spacing between the outer surface of the spring and the induction coil, yet more typically at least about 85% of the length of the spring has a constant spacing between the outer surface of the spring and the induction coil, still yet more typically at least about 90% of the length of the spring has a constant spacing between the outer surface of the spring and the induction coil, yet even more typically at least about 95% of the length of the spring has a constant spacing between the outer surface of the spring and the induction coil, and still yet even more typically about 96-100% f the length of the spring has a constant spacing between the outer surface of the spring and the induction coil. Typically, the spacing of the outer surface of the helical spring from the coil legs of the induction coil is about 0.25-10 times the wire diameter of the helical spring, more typically the spacing of the outer surface of the helical spring from the coil legs of the induction coil is about 0.25-5 times the wire diameter of the helical spring, still more typically the spacing of the outer surface of the helical spring from the coil legs of the induction coil is about 0.5-3 times the wire diameter of the helical spring, even more typically the spacing of the outer surface of the helical spring from the coil legs of the induction coil is about 0.5-2 times the wire diameter of the helical spring, and still even more typically the spacing of the outer surface of the helical spring from the coil legs of the induction coil is about 1-2 times the wire diameter of the helical spring.

Figure 7:
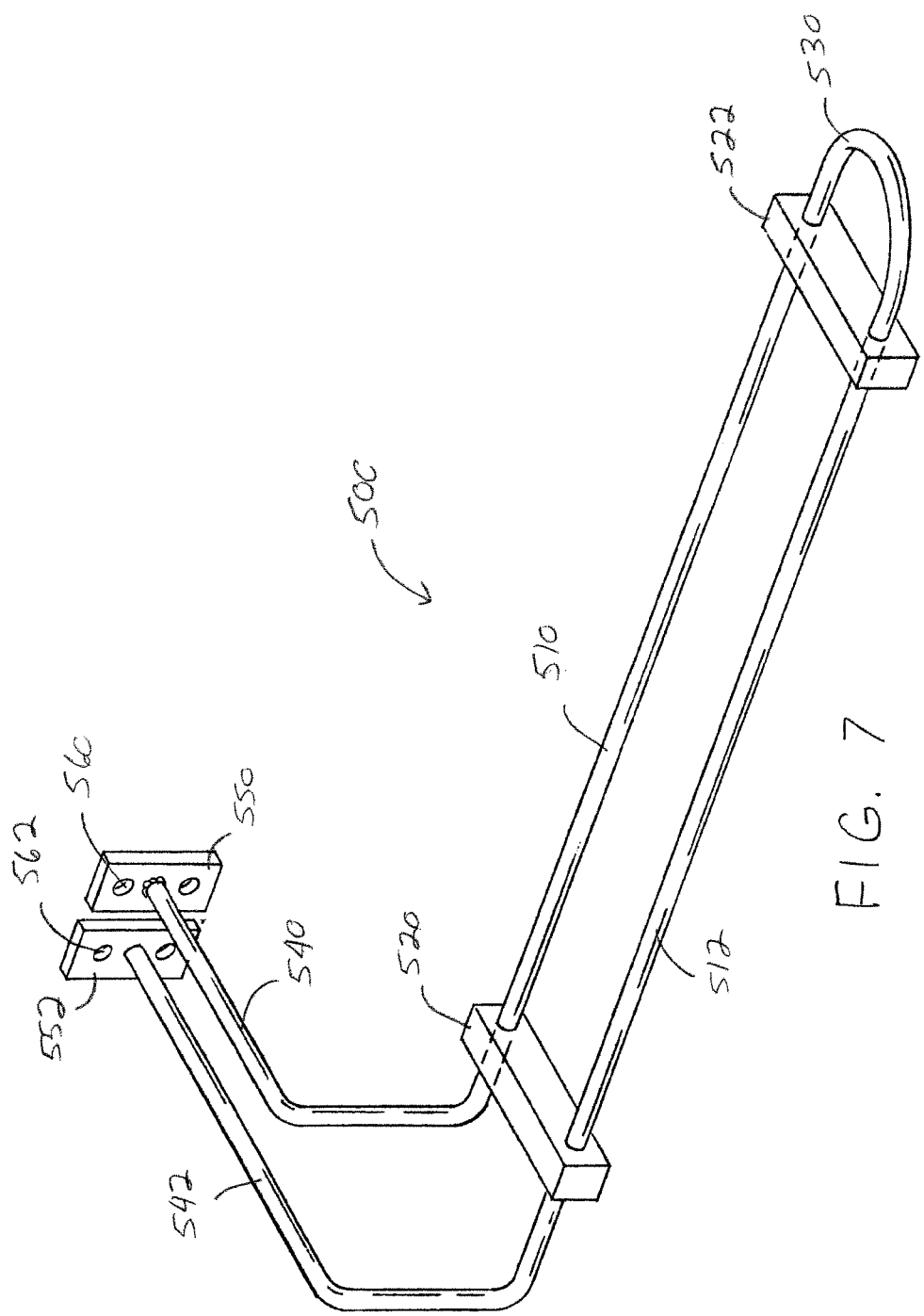
FIG. 7 is an elevation view of one non-limiting induction coil that can be used to heat a spring in accordance with the present invention.
Figure 8:
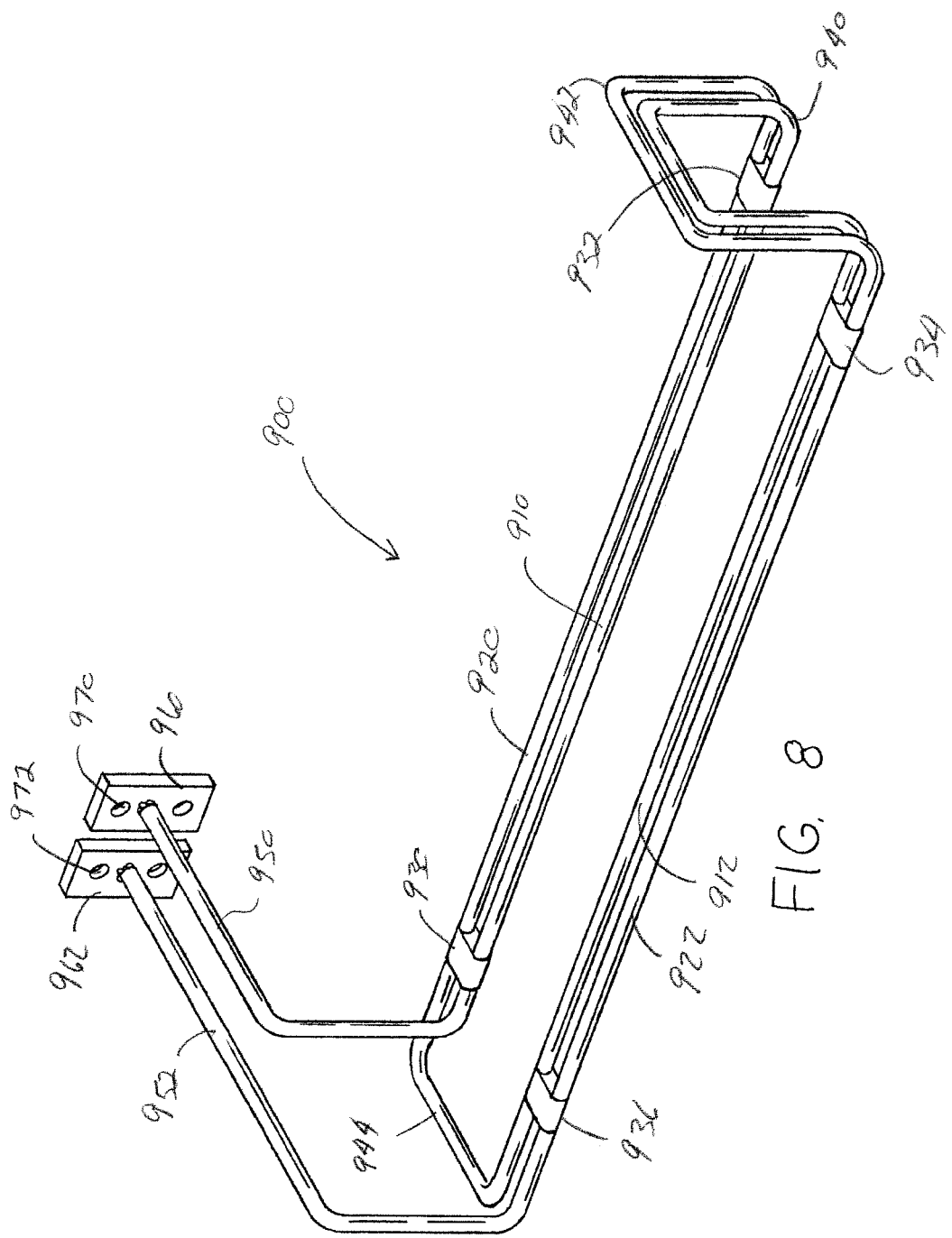
FIG. 8 is an elevation view of another non-limiting induction coil that can be used to heat a spring in accordance with the present invention; and, FIG. 9 is a graph that compares the residual stress of a hardened spring relative to the depth of the spring by the hardening process in accordance with the present invention to a conventional hardening process.

The shape of the induction coil used to heat one or more helical springs on the roller is non-limiting. FIGS. 2 and 7 illustrate one non-limiting configuration of an induction coil that can be used in the present invention. FIG. 8 illustrates another non-limiting configuration of an induction coil that can be used in the present invention. In each of the induction coil configurations illustrated in FIGS. 2, 7 and 8, the coil legs of the induction heating coil are positioned parallel to one another. Such parallel arrangement of the coil legs has been found to create uniform heating of the helical springs when such helical springs are positioned on rollers.

Referring now to FIGS. 2 and 7, induction coil 500 includes coil legs 510, 512, two spacers 520, 522, an end portion 530, two connection legs 540, 542 that each includes a connection plate 550, 552. Connection plates 550, 552 are designed to be connected to a power and cooling fluid source 600 as illustrated in FIGS. 1 and 2. The connection plates include openings 560, 562 that are used to connect to a connection panel 610, 612 on the power and cooling fluid source 600. The induction coil is generally formed of an electrically conductive material such as, but not limited to, copper. The induction coil is generally tubular to allow a cooling fluid to flow in the tubing to cool the tubing when a current is passed through the induction coil. Spacers 520, 522 are generally formed from a non-electrically conducting material such as, but not limited to a ceramic material. The shape and size of end portion 530 and connection legs 540, 542 are non-limiting. The cross-sectional shape and cross-sectional area of coil legs 510, 512 are non-limiting. Generally, the cross-sectional shape and cross-sectional area of coil legs 510, 512 are the same and are constant along the longitudinal length of the coil legs; however, this is not required. The cross-sectional shape of the coil legs is illustrated as being generally circular; however, it can be appreciated that other cross-sectional shapes can be used (e.g., oval, square, rectangular, other polygonal shapes, etc.).

Referring now to FIG. 8, induction coil 900 is double loop induction coil, whereas induction coil 500 illustrated in FIGS. 2 and 7 is a single loop induction coil. Induction coil 900 includes inner coil legs 910, 912, outer coil legs 920, 922, four coil spacers 930, 932, 934, 936, an end portions 940, 942, an intermediate portion 944, two connection legs 950, 952 that each include a connection plate 960, 962. Connection plates 960, 962 are designed to be connected to the power and cooling fluid source 600. The connection plates include openings 970, 972 that are used to connect to a connection panel 610, 612 on the power and cooling fluid source 600. The materials used to form induction coil 900 is similar to the materials discussed above that are used to form induction coil 500. The spacers are illustrated as maintaining a space between inner coil legs and outer coil legs; however, it can be appreciated that one or more spacers can be used to also or alternatively maintain a space between the inner coil legs. The inner coil legs and outer coil legs are illustrated as being parallel to one another. The cross-sectional shape and cross-sectional area of the inner coil legs and outer coil legs are non-limiting. Generally, the cross-sectional shape and cross-sectional area of the inner coil legs and outer coil legs are the same and are constant along the longitudinal length of the coil legs; however, this is not required. The central longitudinal axis of the inner coil legs and outer coil legs generally lies in the same plane; however, this is not required. The spacing between adjacently positioned inner coil legs and outer coil legs are generally maintained constant along the complete longitudinal length of the inner coil legs and outer coil legs. Generally the spacing between adjacently positioned inner coil legs and outer coil legs is at least about 0.01 times the average width (e.g., diameter for a tubular leg) of the inner coil legs and/or outer coil legs. Typically, the spacing between adjacently positioned inner coil legs and outer coil legs is about 0.01-3 times the average width of the inner coil legs and/or outer coil legs, more typically about 0.01-2 times the average width of the inner coil legs and/or outer coil legs, even more typically about 0.01-1 times the average width of the inner coil legs and/or outer coil legs, and still even more typically about 0.05-0.5 times the average width of the inner coil legs and/or outer coil legs. The shape and size of end portions 940, 942, intermediate portion 944 and connection legs 950, 952 is non-limiting. End portions 940, 942 are illustrated as curving upward from the horizontal plane of the inner coil legs and outer coil legs; however, this is not required. As can be appreciated, the end portions can alternatively be curved downward. The curved-up configuration of the end portions can be used to enable one or more helical coils to be feed between the inner coil legs and outer coil legs; however, this is not required. For example, the speed and/or direction of rotation of one or both roller can be used to more one or more helical springs along the longitudinal length of the rollers. One or more rollers can optionally include one or more non-smooth regions (e.g., grooves, ridges, etc.) to facilitate in the movement of the one or more non-smooth regions along the longitudinal length of the rollers. The configuration of the end portions can be used in such a feeding arrangement. As can be appreciated, intermediate portion 944 can also be curved upwardly or downwardly to facilitate in the longitudinal movement of the helical springs on the rollers. Induction coil 900 has a "rounded rectangular" shape. It was found that this coil configuration intensified the eddy currents in the helical springs during heating and provided a more concentrated surface heating pattern when the coils were positioned slightly inside of each other. This induction coil configuration provided very consistent heating distribution throughout Curie temperature, and was able to heat up to helical springs to Austenization in less than 1-2 minutes. The coils of the induction coil are illustrated as lying in substantially the same horizontal plane as the loops of each of the two coils progressively become smaller.

Induction coil 900 can be modified to have more than two loops. Also, induction coil 900 can be modified so that there are a different number of legs on each side of the induction coil (e.g., one coil leg on one side and two coil legs on the other side, etc.).

Another type of induction coil, not shown, that can be used is an induction coil that includes two sets of coil legs wherein each coil leg is divided in a plurality of leg segments. Each coil leg can be formed of a plurality of leg segments (e.g., 2 leg segments, 3 leg segments, 4 leg segments, 5 leg segments, etc.) The leg segments for the two coil legs can have generally the same length, cross-sectional shape and cross-sectional size; however, this is not required. The cross-sectional shape of the leg segments is non-limiting (e.g., square-shaped, circular, oval, other polygonal shapes, etc.). The leg segments of coil legs generally are aligned with one another to face one another and have the same length, cross-sectional shape and cross-sectional size as the opposing segment; however, this is not required. The central axis of the leg segments of each coil leg generally lies in the same axis; however, this is not required. The central axis of the two coil legs is generally parallel to one another and lies in the same horizontal plane; however, this is not required. Intermediate connectors can be used to connect the leg segments of the coil leg together; however, this is not required. The shape and size of the intermediate connectors is non limiting. The induction coil can include an end portion that connects together the two coil legs; however, this is not required. Two connection legs that each includes a connection plate can be connected to the two coil legs. The configuration and function of the two connection legs can be the same as the connection legs illustrated in FIGS. 2, 7 and 8; however, this is not required. The materials used to form the induction coil can be similar to the materials discussed above that are used to form induction coil 500 and/or 900; however, this is not required. One or more spacers can be used to maintain a spacing between the coil legs; however, this is not required. Each oppositely facing leg segments can be designed to heat a single helical spring. As such, induction coil that has three sets of oppositely facing leg segments can be used to simultaneously heat up to three helical springs. As can be appreciated, such an induction coil can be used to only heat one helical spring at a time or two helical springs at a time. The spacing of the leg segments from one another can be used to ensure that the helical springs that are positioned between each opposing pair of leg segments are spaced a sufficient distance from one another to ensure proper heating of the helical springs when two or more springs are simultaneously heated.

Referring again to FIG. 1, control arrangement 800 is used to control the power to the induction coil, cooling of the induction coil, and/or rotational speed of one or both rollers. As can be appreciated, control arrangement 800 can have other or additional functions. Control arrangement 800 is illustrated as being connected to processing frame 210; however, this is not required. FIG. 2 illustrates that power and cooling fluid source 600 is also connected to processing frame 210; however, this is not required. Control arrangement 800 can include one more switches 802, display panels 804, software programs, processors, etc. to monitor and/or control the heating and hardening of the helical springs. The operation of induction systems is well known in the art, thus will not be described in detail herein. Control arrangement 800 can optionally include a temperature monitor 810 that can be used to monitor the temperature of the helical spring. This temperature information can be used to control the heating of the helical spring.

Referring now to FIG. 3, rollers 340, 342 are designed to rotate as illustrated by the arrows as the helical spring is heated by the induction coil. FIG. 3 illustrates that the rollers are spaced from and positioned below the induction coil. When rollers rotate, such rotation causes the helical spring to rotate as indicated by the arrow. The helical spring can be rotated clockwise and/or counter clockwise while the helical spring is heated. The speed of rotation of the helical spring can be controlled by controlling the speed of rotation of the rollers. The helical spring can be rotated prior to, during, and/or after the heating process for the helical spring. Generally, the helical spring is rotated during at least a majority of the time the helical spring is being heated, typically at least about 70 percent of the time the helical spring is being heated, more typically at least about 75 percent of the time the helical spring is being heated, still more typically at least about 80 percent of the time the helical spring is being heated, even more typically at least about 90 percent of the time the helical spring is being heated, still even more typically at least about 95 percent of the time the helical spring is being heated, and yet even more typically 100 percent of the time the helical spring is being heated. Generally, during the heating of the helical coil, the helical coil is rotated at a constant speed throughout the heating process; however, this is not required. The speed of rotation has been found to affect the heating of the helical spring. It has been found that when the helical spring is rotated too fast, the helical spring can be improperly heated. The rotational speed of the helical spring during induction heating is generally less than about 100 rpm, typically less than about 50 rpm, more typically about 0.25-40 rpm, even more typically about 1-30 rpm, and even more typically about 2-20 rpm.

Figure 5:
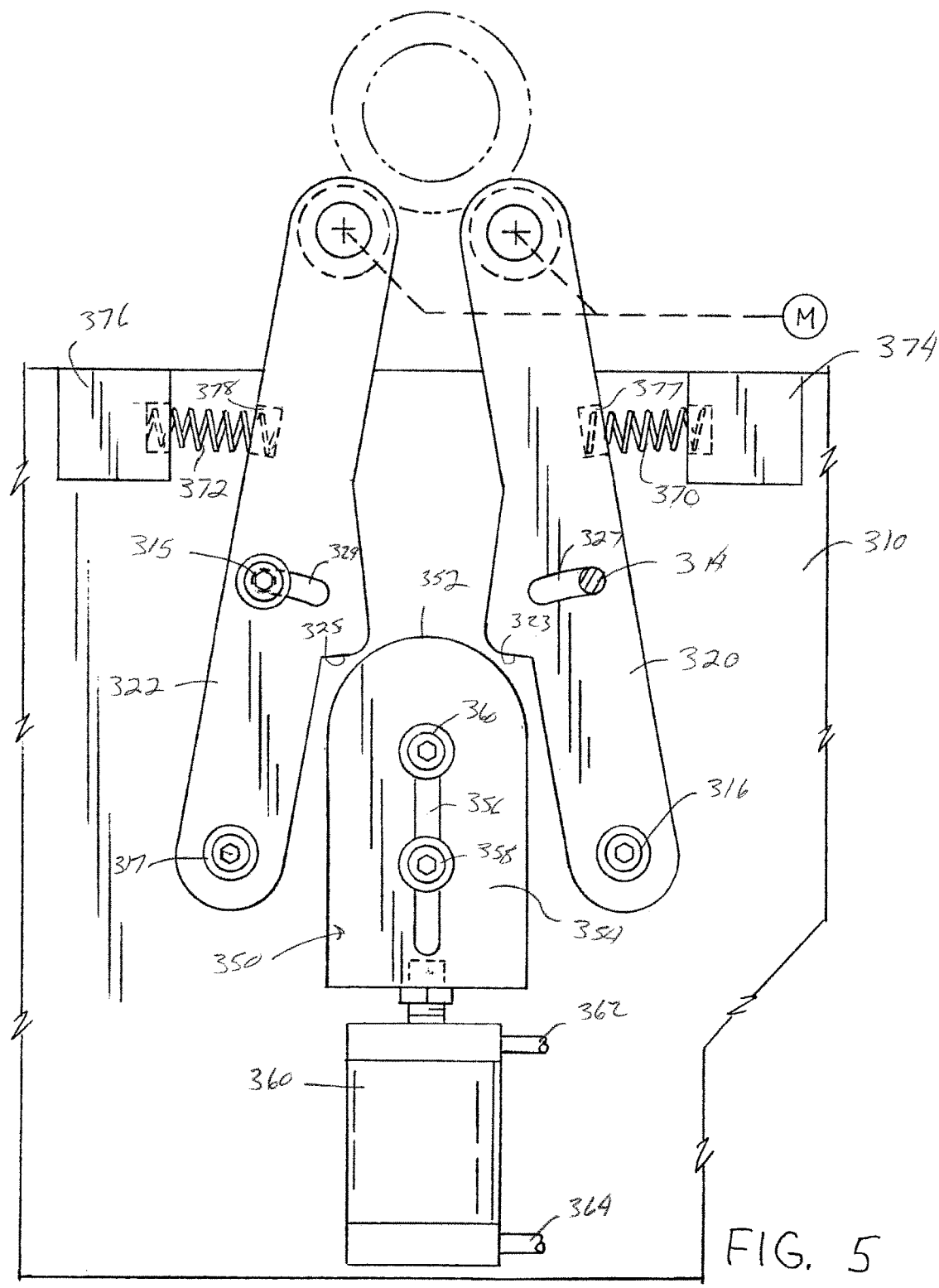
FIG. 5 is a cross-section view along line 5-5 of FIG. 1.
Figure 6:
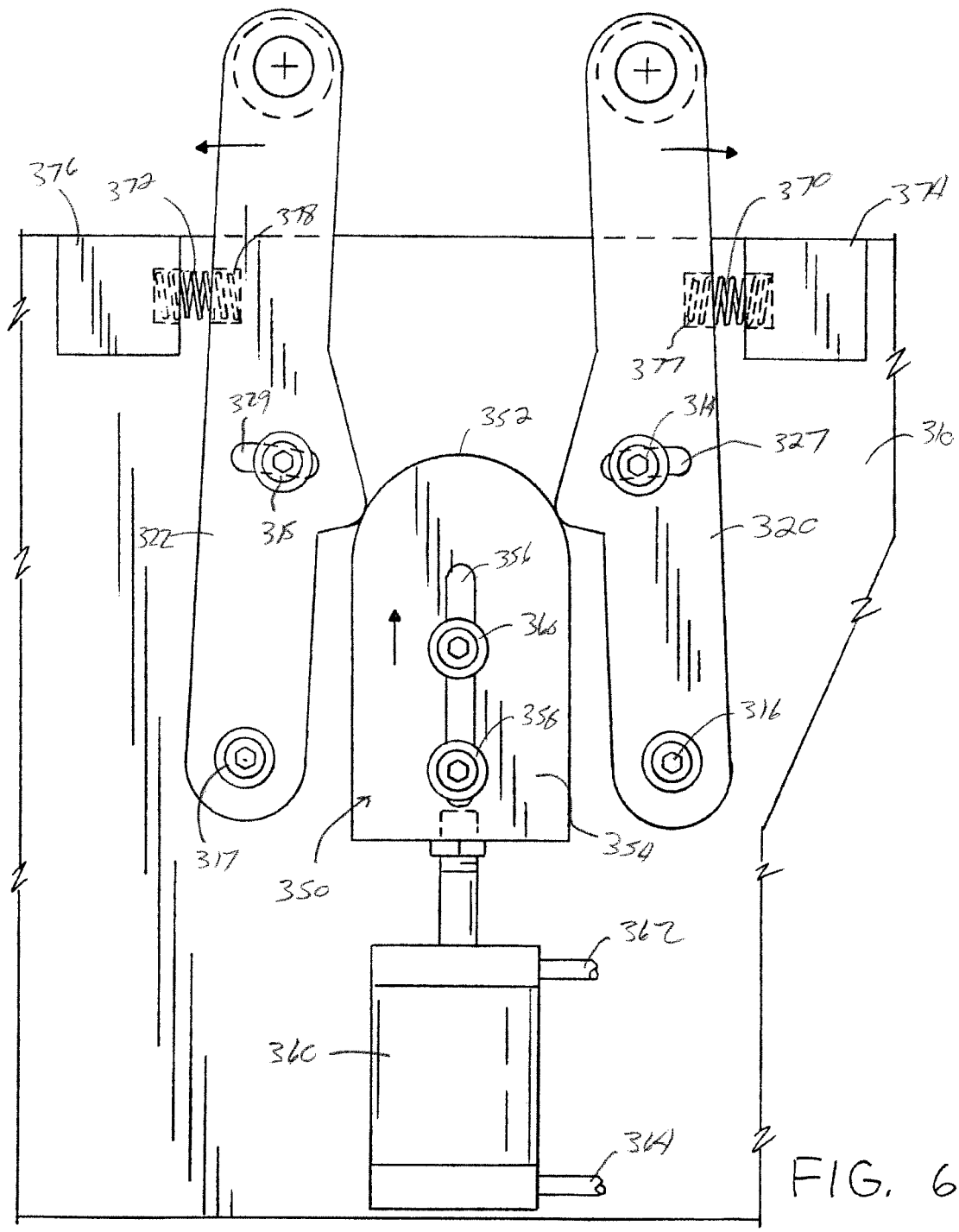
FIG. 6 has a similar cross-section of FIG. 5 except that the rollers are separated.

The spacing of the rollers from one another can be adjusted to properly position the helical spring relative to the coil legs of the induction coil; however, this is not required. The spacing of the rollers can be decreased to raise the helical coil relative to the coil legs of the induction coil or the spacing can be increased to lower the helical coil relative to the coil legs of the induction coil. Referring now to FIGS. 2, 5 and 6, the spacing of the roller support legs 320, 322, 330, 332 can be adjusted by adjustment flange 350. The adjusted flange is designed to move up and down by a drive arrangement 360. The drive arrangement can be an electric motor that is powered and/or controlled via cables 362, 364. Control arrangement 800 can be used to control the operation of the drive arrangement; however, this is not required. As can be appreciated, the drive arrangement can be a manual mechanism. One non-limiting configuration of the adjusted flange is illustrated in FIGS. 2, 5 and 6. The top portion 352 of the adjustment flange is illustrated as being curved; however, this is not required. The body 354 of the adjustment flange includes a vertical slot 356 wherein pins 358, 360 slide within the slot. The pins can also be used to secure the adjustment flange to end plate 310; however, this is not required. The top portion of the adjustment flange is designed to engage a shoulder portion 323, 325 on roller support legs 320, 322. Roller support legs 320, 322 are pivotally mounted to end plate 310. The roller support legs include a slot 327, 329 that allow pins 314, 315 to move therein. Roller support legs 320, 322 are mounted to end plate 310 by pins 316, 317 and pivot about pins 316, 317. The size of slots 327, 329 limit the amount of movement of the roller support legs relative to one another. Biasing springs 370, 372 can be used to bias the roller support legs together; however, this is not required. Spring mounts 374, 376 can be connected to end plate 310 to engage one end of the biasing springs and the other end of the biasing spring can be inserted into spring slot 377, 378 on the roller support legs. As illustrated in FIG. 6, when adjustment flange 350 moves upwardly, the top portion of the adjustment engages the shoulder portions 323, 325 on roller support legs 320, 322 and causes the roller support legs to separate from one another. Slot 356 and pins 358, 360 are used to limit the range of movement of the adjustment flange. When the adjustment flange moves downwardly, the top portion of the adjustment moves down and disengages from the shoulder portions 323, 325 on roller support legs 320, 322 and the biasing springs cause the roller support legs to move toward one another as illustrated in FIG. 5. A similar arrangement is used on roller support legs 330, 332 on end plate 312 as partially illustrated in FIG. 1; however, this is not required. As can be appreciated, many different arrangements can be used to cause the roller support legs to move toward and away from one another so as to adjust the spacing of the rollers from one another.

During operation of processing arrangement 100, the helical springs can be manually or automatically inserted onto the rollers and/or positioned on the rollers relative to the induction coil. The heating process for the helical springs can be manually or automatically controlled.

Figure 4:
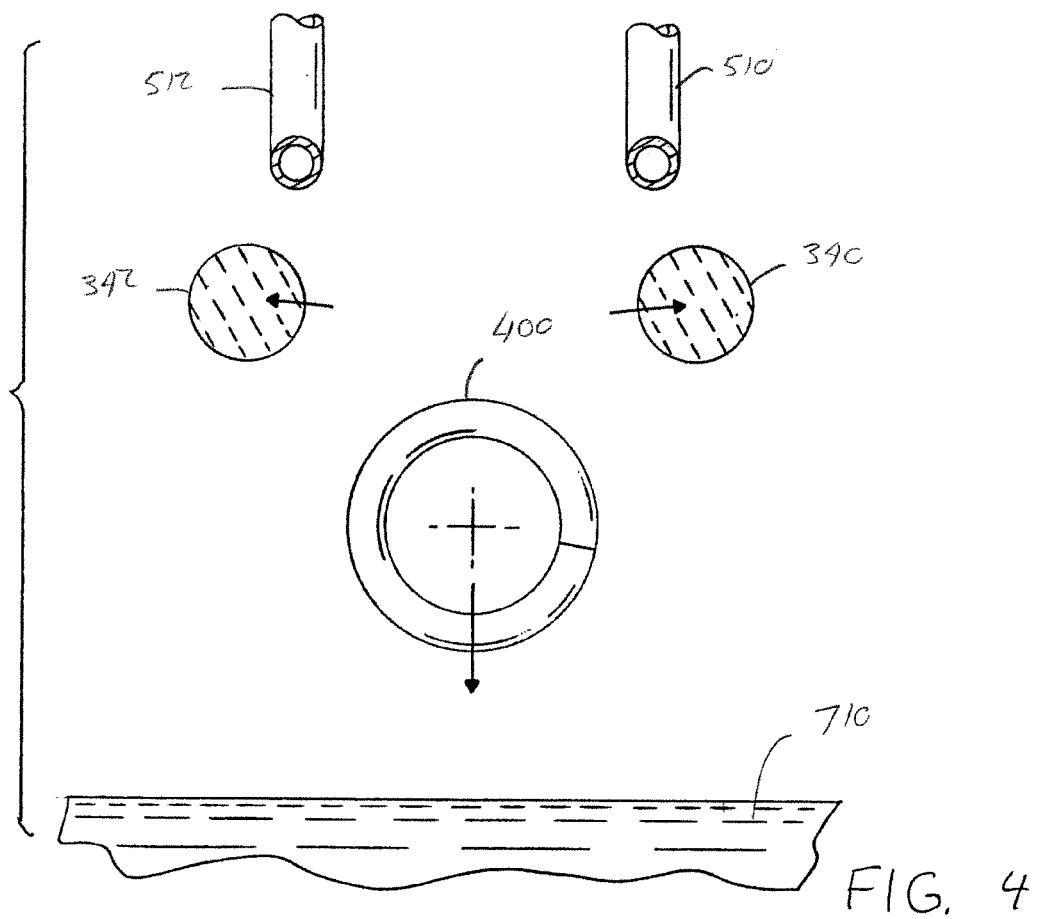
FIG. 4 has a similar cross-section of FIG. 3 except that the rollers are separated to enable the spring to pass between the rollers.

After the one or more helical springs on the rollers have been heated, the helical springs are typically quenched to complete the hardening process. Generally, the springs are sprayed with and/or dipped into a quench liquid. The typical of quench liquid used is non-limiting. As illustrated in FIG. 1, a quench arrangement 700 is positioned beneath the rollers and induction coil. As can be appreciated, the quench arrangement 700 can be positioned in other locations. The quench arrangement 700 is illustrated as including a quench tank 702 which includes a quench fluid 710. The quench tank includes legs 704 and wheels 706 to allow the quench tank to be moved; however, this is not required. The quench tank can include a drain valve 708 to drain the quench fluid from the quench tank; however, this is not required. The size and configuration of the quench tank is non-limiting. In the non-limiting embodiment illustrated in FIG. 1, the helical springs are dropped into the quench tank to be quenched after the helical springs are heated. The rollers are moved away from one another as illustrated in FIG. 6 to allow the helical spring to fall between the rollers as illustrated in FIG. 4 and to fall into the quench liquid 710 in the quench tank. Once the helical spring falls into the quench tank, the rollers can be moved together so that new helical springs can be heated by the induction coil. The helical springs in the quench tank can be manually or automatically removed from the quench liquid after the helical springs have been properly quenched.

Figure 9:
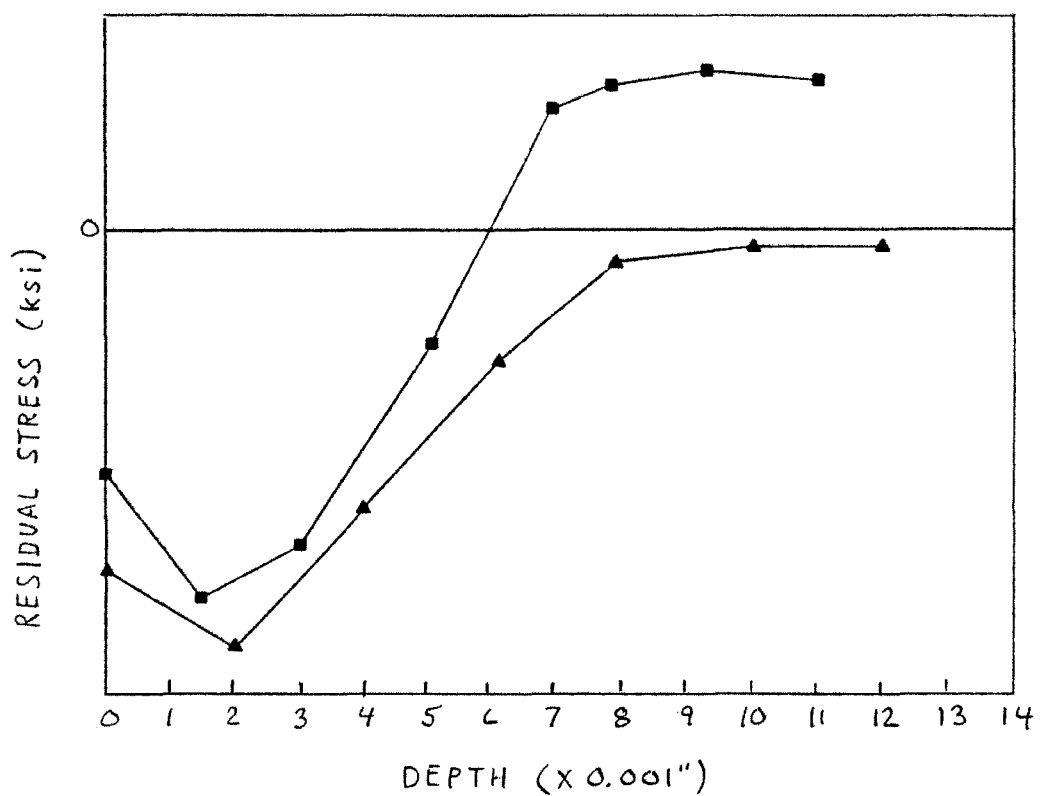

The process for heating and hardening helical springs in accordance with the present invention resulted in hardened springs having similar or improved properties to helical springs that have been heated in conventional ovens. The micro-hardness profile for helical springs heated by the process of the present invention had thorough and even hardening of the helical spring material, and exhibited improved micro-hardness as compared to a helical spring that was heated in a conventional heating oven. The process for heating and hardening helical springs in accordance with the present invention also resulted in hardened springs having a similar martensitic grain structure with similar grain growth as compared to a helical spring that was heated in a conventional heating oven. The process for heating and hardening helical springs in accordance with the present invention also resulted in hardened springs having improved spring loss rates as compared to helical springs that were heated in a traditional heating oven. As such, the helical springs that were heated and hardened by the process in accordance with the present invention have a longer operational life as compared to similar helical springs that were heated in a traditional heating oven. FIG. 9 illustrates residual stress rates of a helical spring that was heated and hardened by the process in accordance with the present invention and a helical spring that was heated in a traditional or conventional heating oven. The helical spring that was heated and hardened by the process in accordance with the present invention exhibited improved residual stress rates as compared to helical springs that were heated in a traditional heating oven. As such, FIG. 9 illustrates that helical springs that are heated and hardened by the induction heating process in accordance with the present invention have a lower residual stress and a negative residual stress throughout the thickness of the wire of the helical spring. The two springs were also finished by a quench process and shot peen process. The same spring that was heated in a conventional oven exhibited higher residual stress and at a wire depth of about 0.006 inches, the residual stress was a positive number. As such, the helical spring that is heated and hardened by the process of the present invention has a potentially longer operational life as compared to similar helical springs that were heated in a traditional heating oven.

As can be appreciated, once the helical spring is heated by the process of the present invention, the helical spring can be further processed to achieve the desired final properties of the helical spring. Such further processes can include quenching the helical spring after induction heating, stress relieving the helical spring after induction heating (e.g., tempering, etc.), shot peen (single or double shot peen) the helical spring to introduce compressive residual stress in the spring, grinding the helical spring, and/or heat setting the helical spring to reset the yield point of the helical spring after the shot peen process. The heat setting process, when used, also forms torsional residual stress in the helical spring. These additional processes in combination with the induction heating process of the present invention result in the formation of a hardened helical spring that has improved properties over comparable helical springs that were heat treated in a traditional heating oven.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

We claim:
1. A method for hardening a spring comprising:
providing a control arrangement having an adjustment flange between a pair of roller support legs driven by a drive arrangement controlled by said control arrangement and a processor executing a software program;

providing a spring, said spring having a helical or beehive shape and an inner and outer surface;

providing a rotation support system configured to support said spring, said rotation support system including a first roller having an outer surface, said outer surface configured to contact said outer surface of said spring and to at least partially support said spring;

providing an induction heating system to heat said spring while said spring is supported on said rotation support system, said induction heating system including an induction coil system having at least one induction coil having a pair of spaced apart coil legs and one end portion extending between the pair of spaced apart coil legs, the pair of spaced apart coil legs positioned in a plane containing the longitudinal axes of the pair of spared apart coil legs, one end portion perpendicularly extending out of said plane, the pair of spaced apart coil legs configured to allow axial advancement of the spring along the rotation support system to a position between the pair of spaced apart leg portions keeping a paced apart leg portions relative to the first roller of the rotation support system stationary, said induction coil system configured to be spaced from said spring during heating of said spring while said spring is supported on said rotation support system;

positioning said outer surface of said spring on said outer surface of said first roller;

axially advancing said spring along said first roller until at least a portion of a longitudinal length along one or more longitudinal sides of the spring is positioned between the spaced apart coil legs and until at least the portion of the longitudinal length along the one or more longitudinal sides of said spring passes under the one end portion of the at least one induction coil;

stopping the axial advancing of said spring once said spring is in a desired position between the spaced apart coil legs; and, rotating said spring by said rotation support system while said induction coil system inductively heats said spring while said spring is at least partially positioned between the spaced apart coil legs and is spaced from said induction coil system.

2. The method as defined in claim 1, wherein said rotation support system both supports and rotates said spring while said spring is heated by said induction heating system.

3. The method as defined in claim 2, wherein said rotation support system rotates said spring at a constant rotation speed during said heating of said spring.

4. The method as defined in claim 2, wherein said rotation support system rotates said spring at a variable rotation speed during said heating of said spring.

5. A method for hardening a spring comprising:

providing a control arrangement having an adjustment flange between a pair of roller support legs driven by a drive arrangement controlled by said control arrangement and a processor executing a software program;

providing a spring, said spring having a helical or beehive shape and an inner and outer surface;

providing a rotation support system configured to support said spring, said rotation support system including a first roller having an outer surface, said outer surface configured to contact said outer surface of said spring and to at least partially support said spring;

providing an induction heating system to heat said spring while said spring is supported on said rotation support system, said induction heating system including an induction coil system, said induction coil system having at least one induction coil having a pair of spaced apart coil legs and one end portion extending between the pair of spaced apart coil legs, the pair of spaced apart coil legs positioned in a plane containing the longitudinal axes of the pair of spared apart coil legs, one end portion perpendicularly extending out of said plane, the pair of spaced apart coil legs configured to allow axial advancement of the spring along the rotation support system to a position between a pair of spaced apart leg portions keeping the pair of spaced apart leg portions relative to the first roller of the rotation support system stationary, the induction coil system configured to be spaced from said spring during heating of said spring while said spring is supported on said rotation support system, said spaced apart coil legs are a) positioned parallel to one another, b) each have a length that is greater than 50% of a longitudinal length of said spring, and c) lie in a plane that is parallel to a longitudinal axis of said spring while said spring is being heated by said induction heating system;

positioning said outer surface of said spring on said outer surface of said first roller;

axially advancing said spring along said first roller until a longitudinal length of said spring is fully positioned between the spaced apart coil legs, said axial advancing causing the longitudinal length of said spring to pass under the one end portion of the at least one induction coil;

stopping the axial advancing of said spring once said spring is positioned between the pair of spaced apart coil legs; and, rotating said spring by at least said first roller while said induction coil system inductively heats said spring while said spring is positioned between the pair of spaced apart coil legs and is spaced from said induction coil system.

6. The method as defined in claim 5, wherein first and second induction coil portions are spaced at a same distance from said outer surface of said spring while said spring is being heated by said induction heating system.

7. The method as defined in claim 5, wherein said induction coil system including third and fourth induction coil portions, said third induction coil portion positioned closely adjacent to and parallel to a first induction portion, said fourth induction coil portion positioned closely adjacent to and parallel to a second induction portion, said third and fourth induction coil portions are spaced at a same distance from said outer surface of said spring while said spring is being heated by said induction heating system, said third induction coil portion positioned at a same distance from said first induction portion as to a distance said fourth induction coil portion is positioned from said second induction coil portion.

8. A method for hardening a spring comprising:

providing a control arrangement having an adjustment flange between a pair of roller support legs driven by a drive arrangement controlled by said control arrangement and a processor executing a software program;

providing a spring, said spring having a helical or beehive shape and an inner and outer surface;

providing a rotation support system configured to support said spring, said rotation support system including first and second rollers that each have an outer surface, said outer surface of said first and second rollers configured to contact said outer surface of said spring and to at least partially support said spring;

providing an induction heating system to heat said spring while said spring is supported on said first and second rollers of said rotation support system, said induction heating system including an induction coil system, said induction coil system having at least one induction coil having a pair of spaced apart coil legs and one end portion perpendicularly extending between the pair of spaced apart coil legs, the induction coil system configured to be spaced from said spring during heating of said spring while said spring is supported on said rotation support system;

positioning said outer surface of said spring on said outer surface of said first roller;

axially advancing said spring along said first and second rollers toward a position between the pair of spaced apart coil legs by rotation of at least one of said first and second rollers until said spring is at least partially positioned between the pair of spaced apart coil legs, said axial advancing causing a longitudinal length of said spring to pass under the one end portion of the at least one induction coil;

stopping the axial advancing of said spring once said spring is at least partially positioned between the pair of spaced apart coil legs;

rotating said spring by said first and second rollers while said induction coil system inductively heats said spring while said spring is maintained in position between the pair of spaced apart coil legs and while the spring is spaced from said induction coil system, and;

separating said first and second rollers to enable said spring to pass between said first and second rollers.

9. The method as defined in claim 8, including a quench tank, said quench tank designed to receive said heated spring after said spring has passed between said first and second rollers.

10. The method as defined in claim 5, wherein said plane of said pair of spaced apart leg portions is positioned above or below a central axis of said spring while said spring is heated.

11. A method for hardening a spring comprising:
providing a control arrangement having an adjustment flange between a pair of roller support legs driven by a drive arrangement controlled by said control arrangement and a processor executing a software program;
providing a spring, said spring having a helical or beehive shape and an inner and outer surface;
providing a rotation support system to support and rotate said spring, said rotation support system including first and second rollers each having an outer surface, said outer surface configured to contact said outer surface of said spring and to at least partially support said spring and to cause said spring to rotate about a spring longitudinal axis when said first and second rollers rotate about a longitudinal axis of said first and second rollers, said outer surface of each said first and second rollers is formed of non-electrically conductive material;
providing an induction heating system to heat said spring while said spring is supported and rotates on said rotation support system, said induction heating system including an induction coil system, said induction coil system including a spaced region configured such that a portion of an induction coil of the induction coil system is positioned on both sides of said spring and spaced from said spring while said rotation support system supports said spring in said spaced region, said induction heating system configured to heat said spring while said spring is positioned in said spaced region and is supported and rotated on said rotation support system;

positioning said outer surface of said spring on said outer surface of said first and second rollers;

advancing said spring axially along said first and second rollers into said spaced region of said coil system, said axial advancing causing a longitudinal length of said spring to pass under one end portion of the induction coil;

stopping axial advancement of said spring once said spring is at least partially in said spaced region; and, rotating and supporting said spring while said spring is maintained at least partially in said spaced region by said first and second rollers while said coil system inductively heats said spring while said spring is on said spaced region.

12. The method as defined in claim 11, wherein said rotation support system rotates said spring at a constant rotation speed during said heating of said spring.

13. The method as defined in claim 12, wherein the induction coil system including first and second induction coil portions that are a) positioned parallel to one another, b) each have a length that is greater than 50% of a longitudinal length of said spring, and c) lie in a plane that is parallel to a longitudinal axis of said spring while said spring is being heated and rotated by said induction heating system, said first and second induction coil portions are spaced at the same distance from said outer surface of said spring while said spring is being heated and rotated by said induction heating system, said plane of said first and second induction coil portions is positioned above or below a central axis of said spring while said spring is heated.

14. The method as defined in claim 13, wherein said induction coil system including third and fourth induction coil portions, said third induction coil portion positioned closely adjacent to and parallel to said first induction coil portion, said fourth induction coil portion positioned closely adjacent to and parallel to said second induction coil portion, the third and fourth induction coil portions are spaced at the same distance from said outer surface of said spring while said spring is being heated by said induction heating system, said third induction coil portion positioned at the same distance from said first induction coil portion as a distance said fourth induction coil portion is positioned from said second induction coil portion.

15. The method as defined in claim 14, wherein said rotation support system includes a roller mechanism, said roller mechanism designed to separate said first and second rollers from one another to enable said spring to pass between said first and second rollers, and further including a step of separating said first and second rollers to enable said spring to pass between said two rollers after said spring has been heated by said induction coil.

16. The method as defined in claim 15, including a quench tank, said quench tank designed to receive said spring after said spring has been heated, and further including a step of passed between said first and second rollers, and including the step of moving said spring into said quench tank after said spring has been heated and has passed between said two rollers.

17. The method as defined in claim 11, wherein said rotation support system rotates said spring at a variable rotation speed during said heating of said spring.

18. The method as defined in claim 11, wherein the induction coil system including first and second induction coil portions that are a) positioned parallel to one another, b) each have a length that is greater than 50% of a longitudinal length of said spring, and c) lie in a plane that is parallel to a longitudinal axis of said spring while said spring is being heated and rotated by said induction heating system, said first and second induction coil portions are spaced at the same distance from said outer surface of said spring while said spring is being heated and rotated by said induction heating system, said plane of said first and second induction coil portions is positioned above or below a central axis of said spring while said spring is heated.

19. The method as defined in claim 18, wherein said induction coil system including third and fourth induction coil portions, said third induction coil portion positioned closely adjacent to and parallel to said first induction coil portion, said fourth induction coil portion positioned closely adjacent to and parallel to said second induction coil portion, the third and fourth induction coil portions are spaced at the same distance from said outer surface of said spring while said spring is being heated by said induction heating system, said third induction coil portion positioned at the same distance from said first induction coil portion as a distance said fourth induction coil portion is positioned from said second induction coil portion.

20. The method as defined in claim 11, wherein said rotation support system includes a roller mechanism, said roller mechanism designed to separate said first and second rollers from one another to enable said spring to pass between said first and second rollers, and further including a step of separating said first and second rollers to enable said spring to pass between said two rollers after said spring has been heated by said induction coil.

21. The method as defined in claim 11, including a quench tank, said quench tank designed to receive said spring after said spring has been heated, and further including a step of moving said spring into said quench tank after said spring has been heated.

22. A method for hardening a spring comprising:
providing a control arrangement having an adjustment flange between a pair of roller support legs driven by a drive arrangement controlled by said control arrangement and a processor executing software program;
providing a spring, said spring having an inner surface and an outer surface and a longitudinal axis;
providing a rotation support system to support said spring, said rotation support system including first and second spring supports and a drive arrangement, each of said first and second spring supports having a longitudinal axis, said first spring support including a first roller having an outer surface, said drive arrangement configured to cause rotation of said first roller, said first and second spring supports configured to support said spring while said longitudinal axis of said spring is parallel to said longitudinal axis of said first spring support, said outer surface of said first roller configured to contact said outer surface of said spring and to at least partially support said spring and to cause said spring to rotate about the spring longitudinal axis when said first roller rotates;
providing an induction heating system to heat said spring while said spring is supported on said rotation support system, said induction heating system including an induction coil system, said induction coil system arranged such that a portion of said induction coil system is positioned on at least one side of said spring during heating of said spring while at least one side of said spring is supported on said rotation support system, said induction coil system having a longitudinal axis aligned with the longitudinal axis of the first spring support;
positioning said outer surface of said spring at least partially on said first roller of said rotation support system;
advancing said spring along the longitudinal axis of the induction coil system with the rotation support system until at least a portion of said spring is positioned adjacent to said induction coil system, said axial advancing causing a longitudinal length of said spring to pass under the one end portion of the induction coil system;
stopping said advancement of said spring once said spring is in a desired location relative to said induction coil system; and,
rotating said spring by said rotation support system while said induction heating system heats said spring and while said spring is maintained at least partially adjacent to said induction coil system.

23. The method as defined in claim 22, wherein said rotation support system includes a second roller having an outer surface, said outer surface of said first and second rollers configured to contact said outer surface of said spring and to at least partially support said spring and to cause said spring to rotate about said longitudinal axis of said spring when at least said first roller rotates about a longitudinal axis of said first roller.

24. The method as defined in claim 23, including a roller mechanism, said roller mechanism configured to separate said first and second rollers from one another to enable said spring to pass between said first and second rollers.

25. The method as defined in claim 24, wherein said induction coil system includes first and second induction coil portions that a) are positioned parallel to one another, b) each have a length that is greater than 50% of the longitudinal length of said spring, and c) lie in a plane that is parallel to the longitudinal axis of said spring while said spring is being heated and rotated by said induction heating system, said first and second induction coil portions are spaced at the same distance from said outer surface of said spring while said spring is being heated and rotated by said rotation support system.

26. The method as defined in claim 25, wherein said induction coil system including third and fourth induction coil portions, said third induction coil portion positioned closely adjacent to and parallel to said first induction coil portion, said fourth induction coil portion positioned closely adjacent to and parallel to said second induction coil portion, the third and fourth induction coil portions are spaced at the same distance from said outer surface of said spring while said spring is being heated by said induction heating system, said third induction coil portion positioned at the same distance from said first induction coil portion as a distance said fourth induction coil portion is positioned from said second induction coil portion.

27. The method as defined in claim 26, including a quench tank, said quench tank designed to receive said heated spring after said spring has passed between said first and second rollers.

28. The method as defined in claim 27, wherein said induction coil system includes one end portion extending between said first and second induction coil portions, the one end portion perpendicularly extending out of said plane that is parallel to said longitudinal axis of said spring, said first and second induction coil portions configured to allow axial advancement of said spring along the rotation support system without having to move said first and second induction coil portions relative to the first roller of the rotation support system, said step of advancing said spring causing at least a portion of said spring to pass under the one end portion.

29. The method as defined in claim 23, wherein said induction coil system includes first and second induction coil portions that a) are positioned parallel to one another, b) each have a length that is greater than 50% of the longitudinal length of said spring, and c) lie in a plane that is parallel to the longitudinal axis of said spring while said spring is being heated and rotated by said induction heating system, said first and second induction coil portions are spaced at the same distance from said outer surface of said spring while said spring is being heated and rotated by said rotation support system.

30. The method as defined in claim 29, wherein said induction coil system including third and fourth induction coil portions, said third induction coil portion positioned closely adjacent to and parallel to said first induction coil portion, said fourth induction coil portion positioned closely adjacent to and parallel to said second induction coil portion, the third and fourth induction coil portions are spaced at the same distance from said outer surface of said spring while said spring is being heated by said induction heating system, said third induction coil portion positioned at the same distance from said first induction coil portion as a distance said fourth induction coil portion is positioned from said second induction coil portion.

31. The method as defined in claim 23, including a quench tank, said quench tank designed to receive said heated spring after said spring has passed between said first and second rollers.

32. The method as defined in claim 22, wherein said induction coil system includes first and second induction coil portions that a) are positioned parallel to one another, b) each have a length that is greater than 50% of the longitudinal length of said spring, and c) lie in a plane that is parallel to the longitudinal axis of said spring while said spring is being heated and rotated by said induction heating system, said first and second induction coil portions are spaced at the same distance from said outer surface of said spring while said spring is being heated and rotated by said rotation support system.

33. The method as defined in claim 32, wherein said induction coil system including third and fourth induction coil portions, said third induction coil portion positioned closely adjacent to and parallel to said first induction coil portion, said fourth induction coil portion positioned closely adjacent to and parallel to said second induction coil portion, the third and fourth induction coil portions are spaced at the same distance from said outer surface of said spring while said spring is being heated by said induction heating system, said third induction coil portion positioned at the same distance from said first induction coil portion as a distance said fourth induction coil portion is positioned from said second induction coil portion.

34. The method as defined in claim 33, wherein said induction coil system includes one end portion extending between said first and second induction coil portions, the one end portion perpendicularly extending out of said plane that is parallel to said longitudinal axis of said spring, said first and second induction coil portions configured to allow axial advancement of said spring along the rotation support system without having to move said first and second induction coil portions relative to the first roller of the rotation support system, said step of advancing said spring causing at least a portion of said spring to pass under the one end portion.

35. The method as defined in claim 32, wherein said induction coil system includes one end portion extending between said first and second induction coil portions, the one end portion perpendicularly extending out of said plane that is parallel to said longitudinal axis of said spring, said first and second induction coil portions configured to allow axial advancement of said spring along the rotation support system without having to move said first and second induction coil portions relative to the first roller of the rotation support system, said step of advancing said spring causing at least a portion of said spring to pass under the one end portion.

36. The method as defined in claim 22, including a quench tank, said quench tank designed to receive said heated spring after said spring has passed between said first and second rollers.

* * * * *